May 17, 1932.   J. J. JUNGERS   1,859,093

BEAN SORTER

Filed Sept. 3, 1927

INVENTOR
John J. Jungers
BY
J. Wm. Ellis
ATTORNEY

Patented May 17, 1932

1,859,093

UNITED STATES PATENT OFFICE

JOHN J. JUNGERS, OF ATTICA, NEW YORK

BEAN SORTER

Application filed September 3, 1927. Serial No. 217,484.

The principal object of my invention has been to provide a machine by which foreign substances may be separated from beans and by which the beans may be graded.

Another object has been to provide a device whereby the separating and grading may be efficiently and quickly done with but little manual labor.

The above objects and advantages have been accomplished by the device shown in the accompanying drawings, of which:

Figure 1:
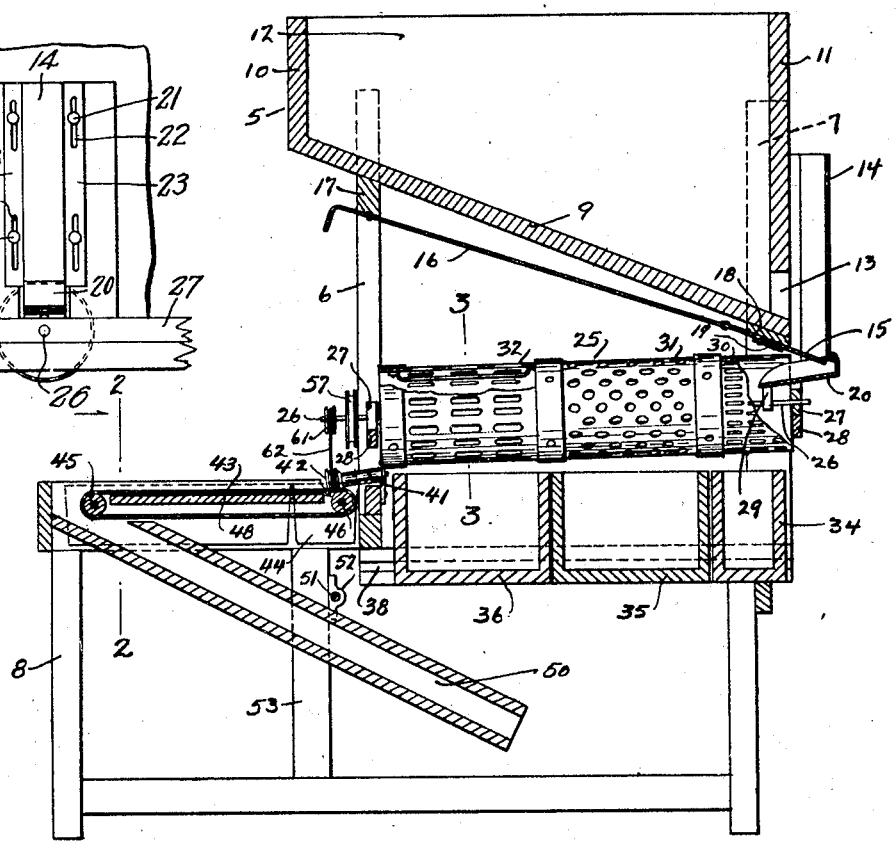
Fig. 1 is a side, sectional elevation.
Figure 4:
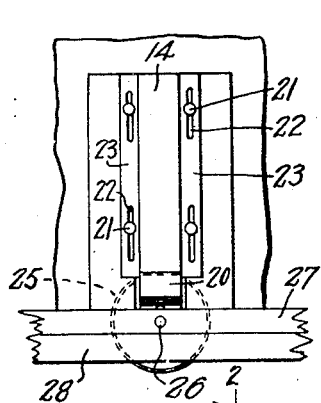
Fig. 4 is a fragmentary end elevation of my device, showing the riser.
Figure 2:
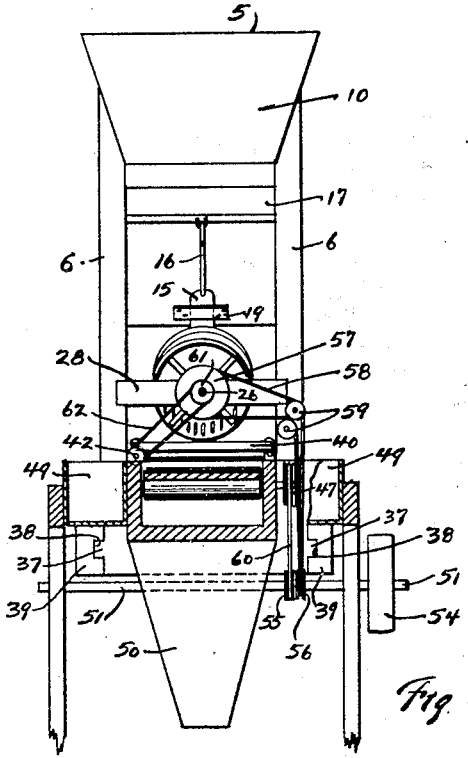
Fig. 2 is a sectional view taken on line 2—2 of Fig. 1.

My device comprises a hopper 5 which is suitably supported by vertical supports 6 and 7, carried by the framework 8 of the device. The hopper is provided with an inclined bottom 9 and with a front wall 10 and rear wall 11, as well as side walls 12. The rear wall 11 of the hopper is provided in its lower side with an outlet opening 13 through which the beans to be separated and graded pass. A riser 14 is arranged outside of the hopper and is attached to the outside of the wall in a vertically adjustable manner as, for instance, by screws 21 passing through slots 22 formed in the flanges 23 of the riser. This riser extends over the opening 13 and upwardly along the wall for a considerable distance. A hopper slide 15 serves to close the bottom of the riser. The slide is operated preferably from the front of the machine by means of a draw rod 16 which is suitably supported at its outer end by the cross member 17, carried by the supports 6. The hopper slide is supported by a cross member 18, carried by the supports 7. A plate 19 is arranged over the slide 15, whereby it is guided in its movement. Pivotally carried at the lower end of the riser 14 is a shaker nozzle 20 which serves as a discharge nozzle for the beans coming from the hopper 5, and this end of the nozzle is adjustable vertically for various sizes of beans by means of the riser.

Figure 3:
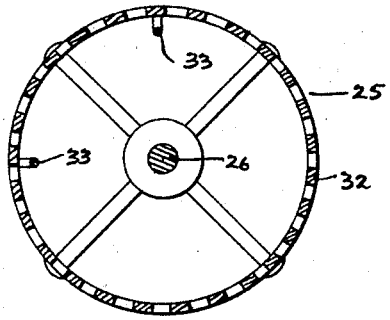
Fig. 3 is an enlarged sectional elevation taken on line 3—3 of Fig. 1.

A separator drum 25 is provided for the device and it is rotatably mounted in an inclined position, having its inlet end higher than its outlet end. The drum is mounted on a shaft 26 which is suitably supported in bearings 27 which are carried by cross pieces 28 fastened to the vertical supports 6 and 7. The bearings 27 are so arranged that the drum may be lifted out and replaced by one having different sized or shaped apertures. The inlet end of the drum passes over the shaker nozzle 20 and a cam 29 is carried by the shaft 26 of the drum and engageable with the end of the shaker nozzle, whereby the nozzle will be raised and lowered as the shaft is rotated, thereby shaking the nozzle. The drum is preferably composed of three sections 30, 31 and 32. The sections 30 at the inlet end of the drum is provided with perforations which are preferably narrow slots, as shown, or relatively small apertures. As the beans drop into this section of the drum, only the fine foreign substances such as dirt and sand will pass through the drum, all of the beans and larger foreign substances passing into section 31 of the drum. Section 31 is provided with a plurality of relatively large holes through which only the small dwarf or pea beans pass, allowing the larger, normally sized beans to pass on into section 32. Section 32 is provided with relatively large elongated slots which permit half or mutilated beans to pass therethrough. As shown in Fig. 3 a number of stops 33 are arranged in this section of the drum. These stops are preferably in the form of wires extending longitudinally along the drum and in relatively close proximity to the inner peripheries thereof. These stops serve to carry around in the drum any half beans which have a tendency to slide on the inner periphery of the drum.

Arranged under the drum is a plurality of receptacles 34, 35, and 36, disposed respectively under the sections 30, 31 and 32. Foreign substances and the dwarf and multilated beans coming through the apertures in the sections 30, 31 and 32 will fall into these receptacles and be collected thereby. Each of the receptacles is provided with a track 37 running longitudinally along two of its opposite sides, and these tracks engage with grooves 38 formed in runways 39 carried by the supporting frame 8 of the device. When the receptacles need to be emptied they are simply slid along in the runways 39 and thereby removed from the machine when they may be conveniently emptied.

Arranged in front of the discharge end of the drum 25 is a lateral conveyor belt 40 which is suitably mounted upon a roller 41 arranged at each side of the machine and which is suitably driven by means of a pulley 42. This conveyor belt is preferably inclined laterally in an outward direction a slight amount, so that all the good beans coming from the hopper will roll off of this belt. All of the good beans, as well as large foreign objects such as stones are deposited upon this belt, the good beans will bounce off of this belt and onto an inspection conveyor belt 43 arranged in front of the lateral conveyor belt 40. This inspection belt is movable in a direction at right angles to the lateral belt and toward the outside end of the machine. Any flat stones, however, or other large foreign objects which are deposited upon the lateral conveyor belt 40 will rest upon this belt and be carried across the machine where they will be deposited within a receptacle 44. The inspection conveyor belt 43 is longitudinally arranged within the frame of the machine and is mounted upon rollers 45 and 46. These rollers are suitably mounted for rotation within the frame, and the shaft of the roll 46 is preferably provided with a drive pulley 47. Arranged beneath the inspection belt 43 is a table 48 upon which the upper pass of the belt preferably rests, so that this pass of the belt will have a foundation when any imperfect beans are to be picked by hand from the beans as they are traveling along on the belt. A receptacle 49 is arranged at each side of the inspection belt into which the imperfect beans may be placed. The perfect beans will be carried along the inspection belt 43 to the end which passes over the roller 45, and dropped off the belt into a discharge hopper 50, where they are collected in any suitable receptacle such as a bushel basket. The device is provided with a drive shaft 51 which is mounted in suitable bearings 52 carried preferably by the vertical struts 53 of the framework. A suitable pulley 54 serves to convey power to the shaft from any suitable source. The shaft 51 has two pulleys 55 and 56 mounted thereon. The pulley 56 is connected to a pulley 57 mounted upon the drum shaft 26 by means of a belt 58. This belt passes over two idler pulleys 59, which are pivotally supported by one of the vertical supports 6. The pulley 55 is connected to the pulley 47 which drives the inspection conveyor belt 43 by means of a belt 60. A pulley 61 is carried by the outwardly extending end of the drum shaft 26, and this pulley is connected to the pulley 42 of the lateral conveyor belt drive by means of a belt 62.

From the foregoing description, it will be obvious that when using my device, the beans which have been thrashed are placed within the hopper 5 whence they will run down through the opening 13 and up into the riser 14. When the hopper slide 15 is opened and the device put into operation, the beans will fall onto the shaker nozzle 20 and be directed thereby into the inlet end of the separator drum 25. As hereinbefore described, the rotation of the cam 29 carried by the drum shaft 26 will cause the nozzle 20 to be shaken, thereby preventing clogging of the beans. The angle of inclination of the shaker nozzle is adjusted in accordance with the kind of beans being sorted, such adjustment being brought about by a vertical adjustment of the riser 14. As the drum is rotated, the beans with the foreign substances will be caused to move toward the outlet end and the foreign substances and the beans will be separated through the various perforations in the several sections of the drum, as hereinbefore described.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A bean sorter comprising a feed hopper having an outlet opening, a riser arranged on the outside of the hopper and opposite the opening, a rotatably mounted separator drum arranged below the hopper, a shaker nozzle pivotally carried by the riser and projecting into the drum, and cam means for shaking the nozzle.

2. A bean sorter comprising a feed hopper having an outlet opening, a riser arranged on the outside of the hopper and opposite the opening, a hopper slide arranged at the bottom of the riser, a rotatably mounted separator drum arranged below the hopper, a shaker nozzle pivotally carried by the riser and projecting into the drum, and cam means for shaking the nozzle.

3. A bean sorter comprising a rigidly mounted, stationary feed hopper, a rotatable, inclined, separator drum, a nozzle pivotally mounted at the outlet end of the hopper for directing beans from the hopper to the feed drum, cam means mounted on the drum shaft and engageable with the opposite end of the nozzle for shaking the same, the drum comprising various sections having different sized perforations, and a receptacle under each of the various sections.

4. A bean sorter comprising a perforated separator drum, an agitated nozzle for conveying beans to the drum, a lateral conveyor belt arranged in front of the outlet end of the drum and having its upper surface inclined in a transverse plane downwardly away from the drum, and a longitudinally movable, inspection conveyor belt arranged adjacent the lateral conveyor belt and at an angle thereto.

5. A bean sorter comprising a rigidly mounted, stationary feed hopper, a rotatable, inclined, separator drum, a nozzle pivotally mounted in an adjustable manner at the outer end of the hopper for directing beans from the hopper to the feed drum, and cam means mounted on the drum shaft and engageable with the opposite end of the nozzle for shaking the same.

In testimony whereof, I have hereunto signed my name.

JOHN J. JUNGERS.